United States Patent [19]

Baker

[11] 4,248,640
[45] Feb. 3, 1981

[54] HUMATE UTILIZATION TECHNIQUES

[76] Inventor: Robert L. Baker, 3201 W. Sixty-Eighth St., Mission Hills, Kans. 66208

[21] Appl. No.: 73,021

[22] Filed: Sep. 6, 1979

[51] Int. Cl.³ .................................................. C04B 7/28
[52] U.S. Cl. ..................................................... 106/103
[58] Field of Search ................................ 106/100, 103

[56] References Cited

U.S. PATENT DOCUMENTS

| | | | |
|---|---|---|---|
| 4,022,630 | 5/1977 | Watson et al. | 106/103 |
| 4,081,285 | 3/1978 | Pennell | 106/100 |
| 4,123,288 | 10/1978 | Stringer et al. | 106/103 |

Primary Examiner—James Poer
Attorney, Agent, or Firm—Connolly and Hutz

[57] ABSTRACT

Humate is utilized by drying the humate which results as a waste product and then mixing it with coal so that it can be burned to result in an ash residue which in turn is mixed with conventional dry cement ingredients for use as cement.

7 Claims, 1 Drawing Figure

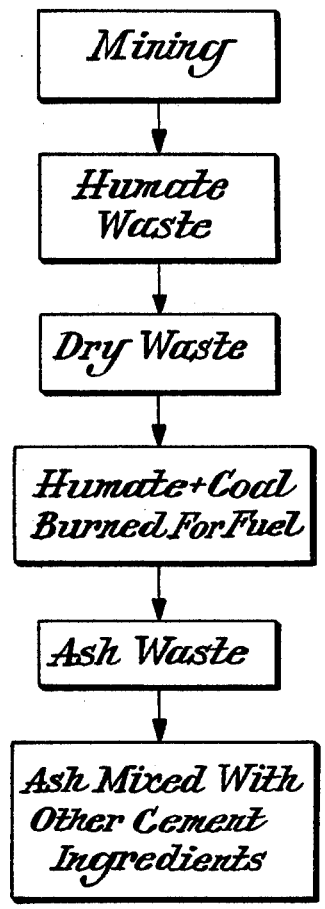

HUMATE UTILIZATION TECHNIQUES

BACKGROUND OF INVENTION

In certain geographical areas, particularly in regions of Florida, an organic material known as humate is found. The form of such humate is generally a crust or covering for sand in swampy areas. Certain manufacturing procedures exist wherein these swampy areas are mined or dredged in order to obtain, for example, the ilmenite which is contained in the sand whereby the sand is thus processed for obtaining titanium dioxide for use as a whitening agent such as in paints. During this mining process, the humate is dissolved by, for example, sulphuric acid, and after the acid is neutralized, the humate is deposited in a retention pond. Thus in this process the humate is a waste material which accumulates in the retention ponds and presents a serious environmental problem.

SUMMARY OF INVENTION

An object of this invention is to provide a means of utilizing humate so that it is converted from a waste product to a useful product while at the same time solving an environmental problem.

A further object of this invention is to provide a process in which the full content of the humate is utilized.

A still further object of this invention is to provide such a process in which the ash content of the humate is utilized.

In accordance with this invention, the humate which ordinarily results as a waste product is dried until its moisture content is at a level whereby the humate may be burned. The thusly dried humate is then mixed with coal and burned. In one embodiment of this invention the burning takes place in a furnace so that the fuel content of the humate may be utilized. After the humate is burned, an ash residue results, and the ash residue is mixed with conventional dry cement ingredients so that the mixture which includes the humate ash residue can be utilized as cement.

THE DRAWING

The single FIGURE schematically illustrates in block diagram the steps used in the practice of this invention for utilizing humate.

DETAILED DESCRIPTION

The U.S. Geological Survey (G.S. Bulletin 1214-B), the terms of which are incorporated herein by reference hereto, identifies humate as an organic material which is coal-like, bearing a close resemblance to lignites or peats. Humate apparently forms by the decomposition of plants resulting in humus, and after leaching there results a dissolved and colloidally dispersed humic substance which by flocculation or precipitation produces the humate. This genesis sequence occurs in certain geographical areas and is particularly common throughout Florida where humate is especially noticeable in hardpan outcroppings. Although hardpan appears to contain a large amount of dark humate, the humate is actually a loose coating on sand grains and represents only about one percent of the total volume. As previously described, the sand grains contain ilmenite which is used for titanium dioxide in the making of whiteners such as in paints. In this process there is a larger scale dredge mining of large volumes of humate from the soil which are released into suspension in the dredge pond water. A serious environmental problem is created. For example, prior to release to public streams the dredge pond water is circulated through clarification ponds where it is treated with sulfuric acid. A loose humate gel is formed and settles to the bottom of the clarification ponds. Periodically, the sediment is air dried to compact the material so that the clarification ponds may be re-used. As can be appreciated, the accumulation of humate not only presents a serious environmental problem, but also represents a supply of material whereby it would be very desirable if some useful technique could be developed for utilizing that otherwise waste material.

The present invention is directed to accomplishing the aforesaid ends, and the invention is based upon the recognition of the characteristics inherent in humate along with the recognition of other fields wherein there is a need for materials of such characteristics or wherein use can be made of this otherwise waste material.

Although the chemical composition of humate varies, a typical composition is as follows.

| | |
|---|---|
| Carbon | 40% |
| Hydrogen | 4 |
| Oxygen | 25 |
| Nitrogen | 0.5 |
| Sulfur | 0.5 |
| Ash | 30 |
| | 100.0% |

Table I list further characteristics of humate.

TABLE I

| Bulk Density | |
|---|---|
| Air dried (in place, 20% moisture) | 50 lbs./cu. ft. |
| Dried at 300°-400° F. | 60 lbs./cu. ft. |
| Dried at 300°-400° F., crushed to −20 mesh | 70 lbs./cu. ft. |

Table II indicates the weight loss of humate in a muffle furnace.

TABLE II

| Weight Loss In Muffle Furnace (Dry-ball milled sample) | |
|---|---|
| Furnace Temperature (30 min./level) | Accumulative % Weight Loss From Original Weight |
| 200° F. | 0.8% |
| 300 | 1.4 |
| 400 | 11.4 |
| 500 | 15.2 |
| 600 | 25.7 |
| 800 | 40.6 |
| 1000 | 46.5 |
| 1300 | 52.3 |
| 1500 | 57.0 |
| 1600* | 70.0 |

*3 hours

Table III indicates the sizing of humate.

TABLE III

| Screen Analysis (Dried at 200° F., micro-pulverized) | | |
|---|---|---|
| Mesh Size | % Weight Retained | % Accumulative Weight Retained |
| +48 | 0.8 | 0.8 |
| +60 | 0.9 | 1.7 |
| +70 | 1.5 | 3.2 |
| +100 | 5.9 | 9.1 |
| +150 | 10.9 | 20.0 |

TABLE III-continued

Screen Analysis
(Dried at 200° F., micro-pulverized)

| Mesh Size | % Weight Retained | % Accumulative Weight Retained |
|---|---|---|
| +250 | 31.0 | 51.0 |
| +250 | 49.0 | 100.0 |
|  | 100.0 |  |

The following Table IV lists the analytical data of humate.

TABLE IV

| | |
|---|---|
| % Weight loss at 200° C. | 12.8 |
| % Weight loss on ignition | 79.2 |
| Emission spec on ash | |
| Si | >10% |
| Al | >10% |
| Fe | 5% |
| Ti | 8% |
| Ca | .5% |
| Zr | .6% |
| Mg | .5% |
| P | .5% |
| Mn | 800 PPM |
| Cr | 500 PPM |
| B | 500 PPM |
| Nb | 300 PPM |
| Pb | 300 PPM |
| Cu | 200 PPM |
| Sr | 200 PPM |
| Ni | 100 PPM |
| Ba | 100 PPM |
| V | 200 PPM |
| Mo | 20 PPM |
| Be | 5 PPM |
| Sn | 50 PPM |

By proper control of burning temperature it is possible to facilitate separation of the ingredients in the ash composition. For example, by burning at about 350° F. it is possible to obtain an ash residue wherein the aluminum content is of the purest form as compared with its form when extracted from a mining operation. At that burning temperature separation of the aluminum and many other major ingredients such as Ti and Mn from the remainder of the ash is rather easily accomplished, whereas at higher temperatures the separation is more difficult. This is particularly advantageous by making it possible to provide a ready source of pure aluminum for various uses such as an additive in the airline industry and in the roll form industry which produces, for example, aluminum siding. Where the invention is practiced for making cement, separation of the ash ingredients is not desired, and thus it is not necessary to adhere to such burning temperature for that purpose. It is, however, to be understood that in its broadest form the invention may also be practiced by utilizing the humate as a source for the individual ash ingredients.

The invention in its preferred practice is based upon the recognition that a major portion, about thirty percent, of the humate composition is ash, and as indicated in Table IV, the major ingredients of ash include calcium, aluminum, iron, titanium and other metals which happen to be the same metals required in cement mixtures. Accordingly, in the preferred practice of the invention, the humate is treated so that its ash content can be utilized for making cement.

The drawing schematically illustrates the steps used in the practice of this invention. As indicated therein, the humate waste results from the dredge mining operation previously described. In order to obtain the ash, the humate is burned. In accordance with the invention, however, it is first necessary to dry the humate until its moisture content is sufficiently low so that it can be burned. While in the pond, the humate is about two-thirds moisture. A natural drying operation takes place by virtue of the sun baking the uppermost humate in the pond, and this dried humate can be skimmed and then burned. Preferably the moisture content is reduced to about twenty-two to twenty-five percent before burning. Alternatively, the humate may be removed from the pond and then permitted to sun dry while outside the pond or if desired, suitable drying equipment may be used to reduce the moisture content.

After the humate is dried, it is mixed with coal and the mixture is burned. At least fifty percent of the mixture should be coal since a large amount of coal is preferable to sustain the burning action. At this point, the invention contemplates obtaining beneficial results from the humate. In this respect, humate has a fuel content of, for example, 4000–6000 BTU/lb. or an average fuel content of about 4500 BTU/lb. Bituminous coal, by contrast, has a fuel content of about 9000–14,000 BTU/lb. The burning of the humate and coal mixture is preferably done in a furnace where use can be made of the humate fuel content. Although humate is ordinarily not as good as coal for fuel purposes, humate would be significantly cheaper than coal so that the mixture of humate and coal would be cheaper than coal alone and yet would still provide sufficient fuel content. This is a particularly desirable recognition since in accordance with the invention, the humate is to be burned in any event in order to obtain the ash.

As previously discussed and later described, the ash is utilized as part of a cement mixture. Accordingly, in the preferred practice of this invention, the humate-coal burning takes place in the very furnaces which are conventionally used for the production of cement. In this manner, all that need be done is to transport the dried humate to the cement-making facility and the ash is thus obtained in the very same facility in which it is later required for utilization in the making of cement. Accordingly the humate is burned in the process for making cement in order to obtain an ingredient (ash) which likewise is used for making cement.

The cement making processes are well known in the art, and a detailed discussion thereof is not necessary. In this respect reference may be had, for example, to any known to any suitable treatise for making cement such as Kirt-Othmer Encyclopedia of, Chemical Technology Second Ed. 1963 Vol. 2, page 5, Vol 4, page 5, Vol. 4, pages 684–709, the details of which are incorporated herein by reference thereto. In general these treatises describe the cement making ingredients which include the same metals found in the ash residue resulting from the burning of humate. Additionally these treatises describe the burning operations utilized for cement making, and in accordance with the invention, the furnace used in these operations may utilize the humate-coal mixture for its fuel content.

In general about two-thirds of the ash residue includes the metals common to the dry cement components or ingredients. In the practice of this invention the ash would replace an equal amount of such dry cement components and the dried mixture would then be mixed with water and gravel, as well as any other conventional components such as reinforcing rods when the cement is mixed for usage. In accordance with the practice of this invention, a typical mixture might include, for example, about forty to fifty percent of the conventional cement components, thirty percent humate ash residue and the balance being water. Since humate otherwise is a waste material, the utilization of its ash residue in a cement mixture represents a distinct economic advantage.

As is apparent, the present invention, therefore, represents a significant step forward in the art by taking a waste product which represents an environmental problem and not only disposes of that waste product, but does so in a manner wherein a desirable end product (cement) is made to utilize the waste product and wherein the fuel content of the waste product is not only utilized, but in fact, is utilized in the very process for making that end product.

What is claimed is:

1. A method of utilizing humate comprising the steps of extracting humate from its natural form, drying the humate until its moisture content is at a level which permits the humate to be burned, mixing the dried humate with a fuel to obtain a combustible mixture, burning the humate-fuel mixture to obtain an ash residue, and mixing the ash with cement components to obtain a mixture for making cement.

2. The method of claim 1 wherein the humate is dried until its moisture content is no greater than 25%.

3. The method of claim 1 wherein about 30% of the humate is ash.

4. The method of claim 1 wherein the fuel is coal, and the humate-coal mixture contains at least 50% coal.

5. The method of claim 1 wherein the humate-fuel mixture is burned in a furnace for utilizing its fuel content.

6. The method of claim 5 wherein the furnace is utilized in the burning operation of the cement making process for making dry cement components in addition to being utilized for producing the ash from the humate-fuel mixture burning.

7. The method of claim 1 wherein the mixture for making cement includes at least 40% of dry cement components other than ash.

* * * * *